(12) United States Patent
Lin et al.

(10) Patent No.: US 8,270,168 B2
(45) Date of Patent: Sep. 18, 2012

(54) HEAT SINK HAVING AUTO SWITCHING FUNCTION, HEAT SINK SYSTEM AND HEAT SINKING METHOD FOR THE SAME

(75) Inventors: Kuo-Len Lin, Wugu Township, Taipei County (TW); Mong-Hua Hung, Wugu Township, Taipei County (TW); Tien-Chih Tseng, Wugu Township, Taipei County (TW); Chen-Hsiang Lin, Wugu Township, Taipei County (TW); Chih-Hung Cheng, Wugu Township, Taipei County (TW)

(73) Assignees: CPUMATE Inc., Taipei County (TW); Golden Sun News Techniques Co., Ltd., Taipei County (TW)

( * ) Notice: Subject to any disclaimer, the term of this patent is extended or adjusted under 35 U.S.C. 154(b) by 97 days.

(21) Appl. No.: 12/779,070

(22) Filed: May 13, 2010

(65) Prior Publication Data
US 2011/0279968 A1   Nov. 17, 2011

(51) Int. Cl.
*H05K 7/20* (2006.01)
(52) U.S. Cl. .................. 361/707; 361/695; 361/679.47; 361/679.48; 361/690; 361/694; 165/80.3; 165/185

(58) Field of Classification Search .................. None
See application file for complete search history.

(56) References Cited

U.S. PATENT DOCUMENTS

| | | | |
|---|---|---|---|
| 5,987,890 A * | 11/1999 | Chiu et al. ................ | 62/3.2 |
| 6,109,039 A * | 8/2000 | Hougham et al. .......... | 62/3.7 |
| 6,275,945 B1 * | 8/2001 | Tsuji et al. ................. | 713/300 |
| 6,415,612 B1 * | 7/2002 | Pokharna et al. ........... | 62/3.2 |
| 6,646,874 B2 * | 11/2003 | Pokharna et al. ........ | 361/679.09 |
| 6,665,163 B2 * | 12/2003 | Yanagisawa ............... | 361/103 |
| 6,687,123 B2 * | 2/2004 | Kitahara ..................... | 361/695 |
| 6,826,047 B1 * | 11/2004 | Chen et al. ................. | 361/679.47 |
| 7,472,215 B1 * | 12/2008 | Mok et al. .................. | 710/304 |
| 7,548,427 B2 * | 6/2009 | Mongia ...................... | 361/700 |
| 7,830,661 B2 * | 11/2010 | Sween et al. ............... | 361/695 |

* cited by examiner

*Primary Examiner* — Boris Chervinsky
(74) *Attorney, Agent, or Firm* — Chun-Ming Shih; HDLS IPR Services

(57) ABSTRACT

A heat sink having auto switching function, a heat sink system and a heat sinking method are disclosed. The heat sink receives a control command sent by an external device. An internal heat sink device is controlled according to content of the control command to control power ON or power OFF of a thermoelectric cooler of the heat sink device or to control power ON, power OFF, or change rotation speed setting of a heat sink fan in the heat sink device. Thus, the heat sink auto switches operations of the heat sink device correspondingly according to temperature changes of the external device.

7 Claims, 7 Drawing Sheets

HEAT SINK HAVING AUTO SWITCHING FUNCTION, HEAT SINK SYSTEM AND HEAT SINKING METHOD FOR THE SAME

BACKGROUND OF THE INVENTION

1. Field of the Invention

The invention generally relates to a heat sink, in particular to a heat sink, a heat sink system having a heat sink and the heat sinking method for the same.

2. Description of Prior Art

Since the invention, computers have become indispensible part of everyday life. Various computers are developed to meet all kinds of demands by users, such as personal computer (PC), notebook (or referred as laptop) or barebones. Among which, notebooks became popular immediately when the product was introduced in the beginning as a result of the easy to carry feature the notebook delivers. Up-to-date, notebook remains the favorite computer category of users.

With the advance of the technology and semiconductor industry, the hardware operating capability is increasing and processing speed becomes faster and faster. At the same time, the heat generated from continuous high speed processing of the hardware also increases. Ordinary personal computer has casing of much larger dimensions which provides spacious space inside the casing. Sufficient space provides better heat sinking performance and allows designs to add one or more heat sink fans or heat sink fins in the casing for offering better heat sinking capacity for hardware components generating more heat such as a CPU (Central Process Unit, CPU), a graphic card and a memory. Though, ordinary notebook is designed by weight and dimension within a certain range in order to be easy to carry for users. As a result, the space free for installing additional heat sink fans or heat sink fins is insufficient. Frequently, a notebook becomes hot or very hot to the touch on its body (in particular the bottom of the notebook). Under the circumstance, operation of the notebook hardware starts to slow down due to excess heat left unattended. In the worst case, the hardware may be burnt by the heat.

To address the above problem, many heat sink pads for heat sinking the heat generated by a notebook are introduced in the market. Refer to FIG. 1, FIG. 1 is a solid diagram of a prior art heat sink. A heat sink pad 10 shown in the FIG. 1 has a base made by heat sinking materials (such as aluminum). When a notebook (not shown) is placed on the heat sink pad 10, the bottom of the notebook directly contacts with the surface of the heat sink pad 10 之 surface 11 where the materials of the heat sink pad perform heat sinking by thermal conduction. Further, the heat sink pad 10 has a switch 12, and installs one or more fans 13 on the bottom of the surface 11. When a power wire 14 is connected to the heat sink pad 10 for powering the heat sink pad 10, heat sinking capability of the heat sink pad 10 is enhanced following the fan 13 is powered ON by the switch 12.

However, the traditional heat sink pad 10 mentioned above has at least the following disadvantages:

1. It is required to manually switch the switch 12 to trigger power ON or power OFF of the fan 13. If the switch 12 is not switched to power ON, the heat sink pad 10 does not perform heat sinking and fails its function. Also, if the switch 12 is not switched to power OFF, the fan 13 continues to operate and creates unnecessary power consumption.

2. The rotation speed of the fan 13 is fixed and does not change in respond to the concurrent temperature of a notebook. Therefore the heat sinking performance is limited.

To address the above problems, a novel system and a method are proposed by the inventor to improve the above problems for increasing the heat sinking performance of a heat sink pad or a heat sink and further enhanced the operation safety of using a notebook.

SUMMARY OF THE INVENTION

The objective of the present invention is to provide a heat sink having auto switching function, heat sink system and the heat sinking method for the same. The heat sink receives a control command sent by an external device as a result of temperature changes for auto controlling operations of a heat sink device according to temperature status of an external device.

To achieve the above objective, a notebook and a heat sink are connected according to the present invention. The temperature of the notebook is detected via a temperature sensing device. When the temperature of the notebook reaches a threshold value, a control command is sent to the heat sink. The heat sink controls a heat sink device according to control command for controlling power ON or power OFF of a thermoelectric cooler of the heat sink device, or to control power ON, power OFF, or change rotation speed setting of a heat sink fan in the heat sink device.

Compare to prior art, the present invention delivers the following advantages. According to the present invention, it is not required to install a switch in a heat sink, neither to manually switch operation mode by a user. The thermoelectric cooler and heat sink fan in a heat sink device directly auto powered ON or powered OFF according to the temperature of the notebook. Thus, unnecessary electricity waste is eliminated when a user forgets to turn off switch circuit mindlessly. Further, if the temperature of a notebook continues to increase or decrease, the rotation speed of the heat sink fan is changed automatically according to the temperature status change of the notebook so as to optimize the heat sinking performance of the heat sink.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
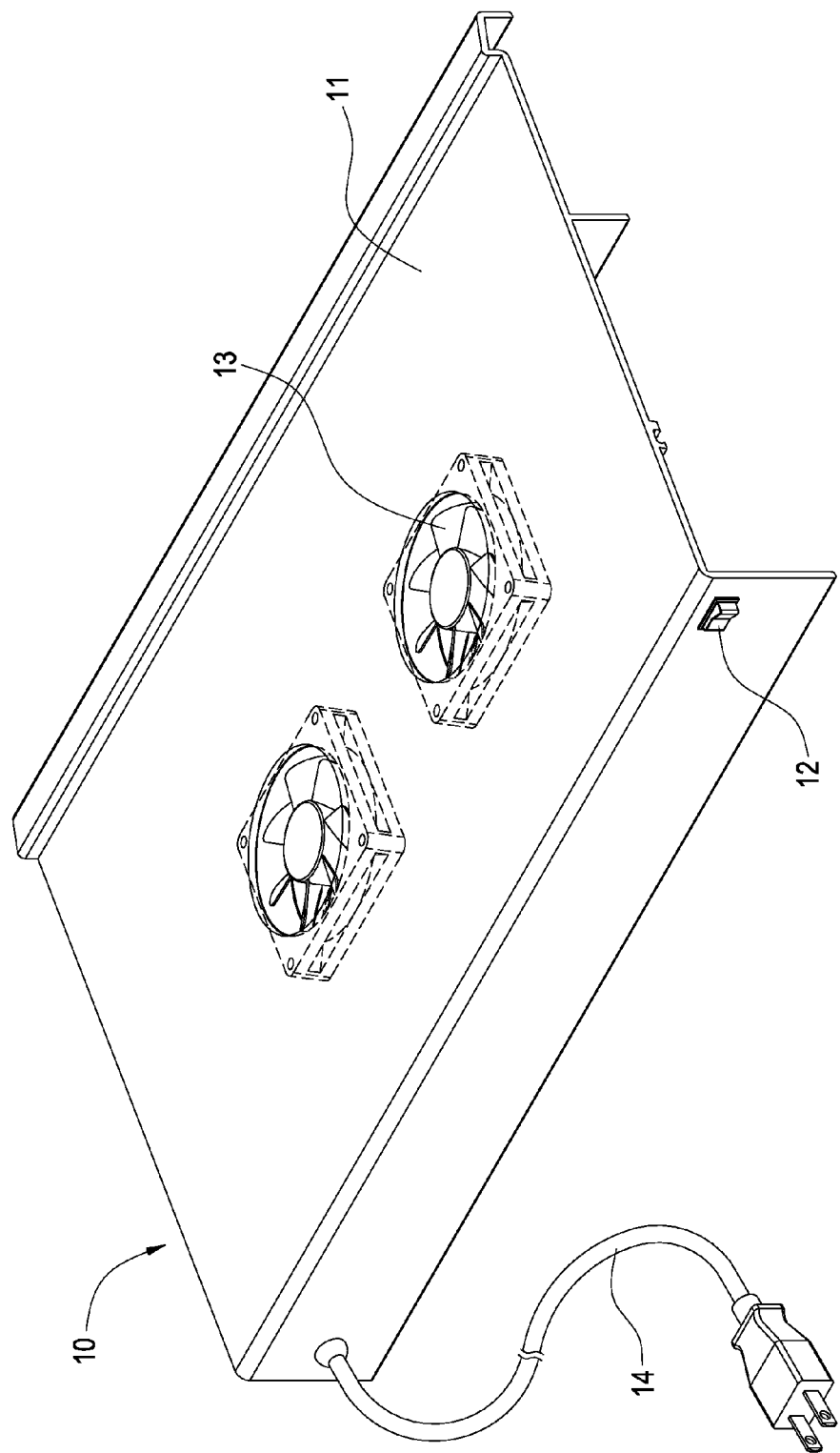
FIG. 1 is a solid diagram of a prior art heat sink.
Figure 2:
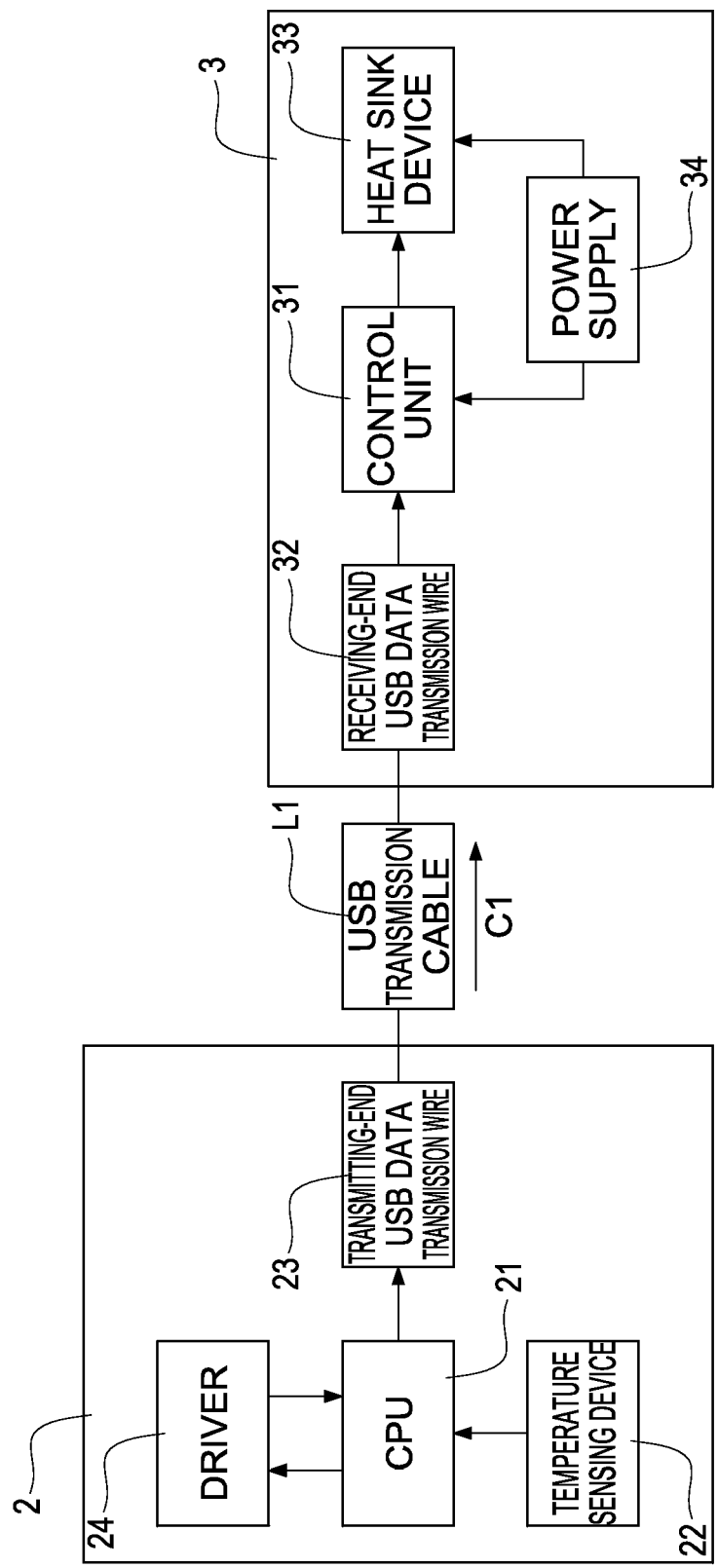
FIG. 2 is a block diagram of a preferred embodiment of the present invention.

FIG. 2 is a block diagram of a preferred embodiment of the present invention. As shown in FIG. 2, heat sink system of the present invention mainly has a notebook 2 and a heat sink 3. The notebook 2 (referred as the computer 2 in the following) mainly comprises a Central Processing Unit (CPU) 21, a temperature sensing device 22 and a transmitting-end Universal Serial Bus (USB) data transmission wiring 23. The temperature sensing device 22 is disposed on the internal hardware components of the computer 2, such as a main board, a memory or the CPU 21 for detecting temperature of the above hardware temperature. The CPU 21 is electrically connected to the temperature sensing device 22 for receiving detected data reported by the temperature sensing device 22 in order to generate a control command C1. The transmitting-end USB data transmission wiring 23 is electrically connected to the CPU 21 for receiving the control command C1 and performing external data transmission.

A driver 24 is installed in the computer 2 and executed by the computer 2. The driver 24 makes determination according to the detected data reported by the temperature sensing device 22 for driving the CPU 21 to generate the corresponding control command C1 (detailed in the following).

The heat sink 3 mainly comprises a control unit 31, a receiving-end USB data transmission wire 32 and one or more heat sink devices 33. The heat sink 3 connects with the computer 2 via the receiving-end USB data transmission wire 32 for receiving the external control command C1, wherein the receiving-end USB data transmission wire 32 is connected to the transmitting-end USB data transmission wiring 23 via a USB transmission cable L1, but the scope of the invention is not limited to the embodiment. The control unit 31 is electrically connected to the receiving-end USB data transmission wire 32 and the heat sink device 33 for receiving the control command C1 and controlling operations of the heat sink device 33 according to the content of the control command C1. It should be noted that, the transmitting-end USB data transmission wiring 23 and the receiving-end USB data transmission wire 32 can be complete USB transmission interfaces or connectors required in the data transmission for transmitting the control command C1.

Figure 3:
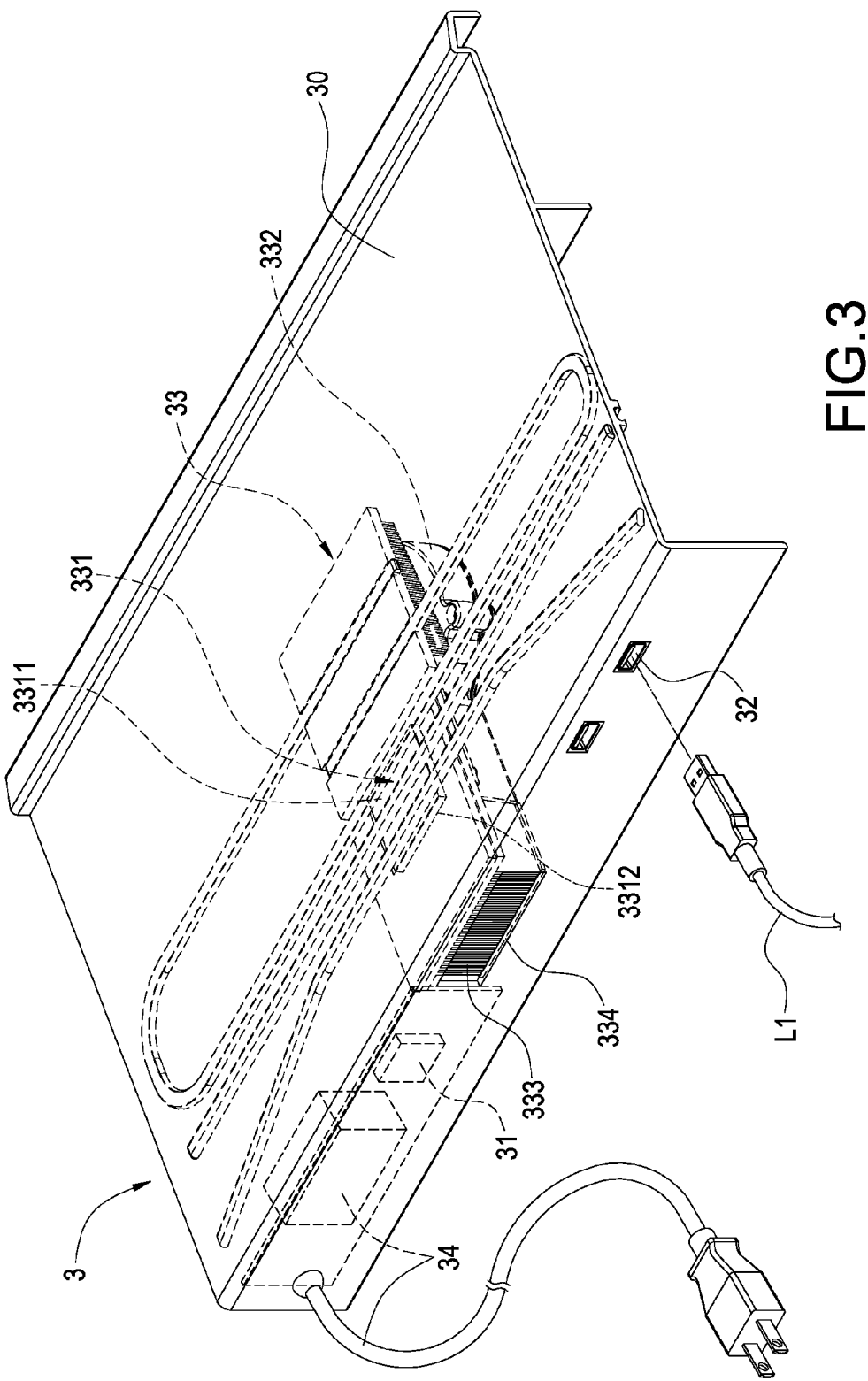
FIG. 3 is a solid diagram of a preferred embodiment of a hint sink according to the present invention.
Figure 4:
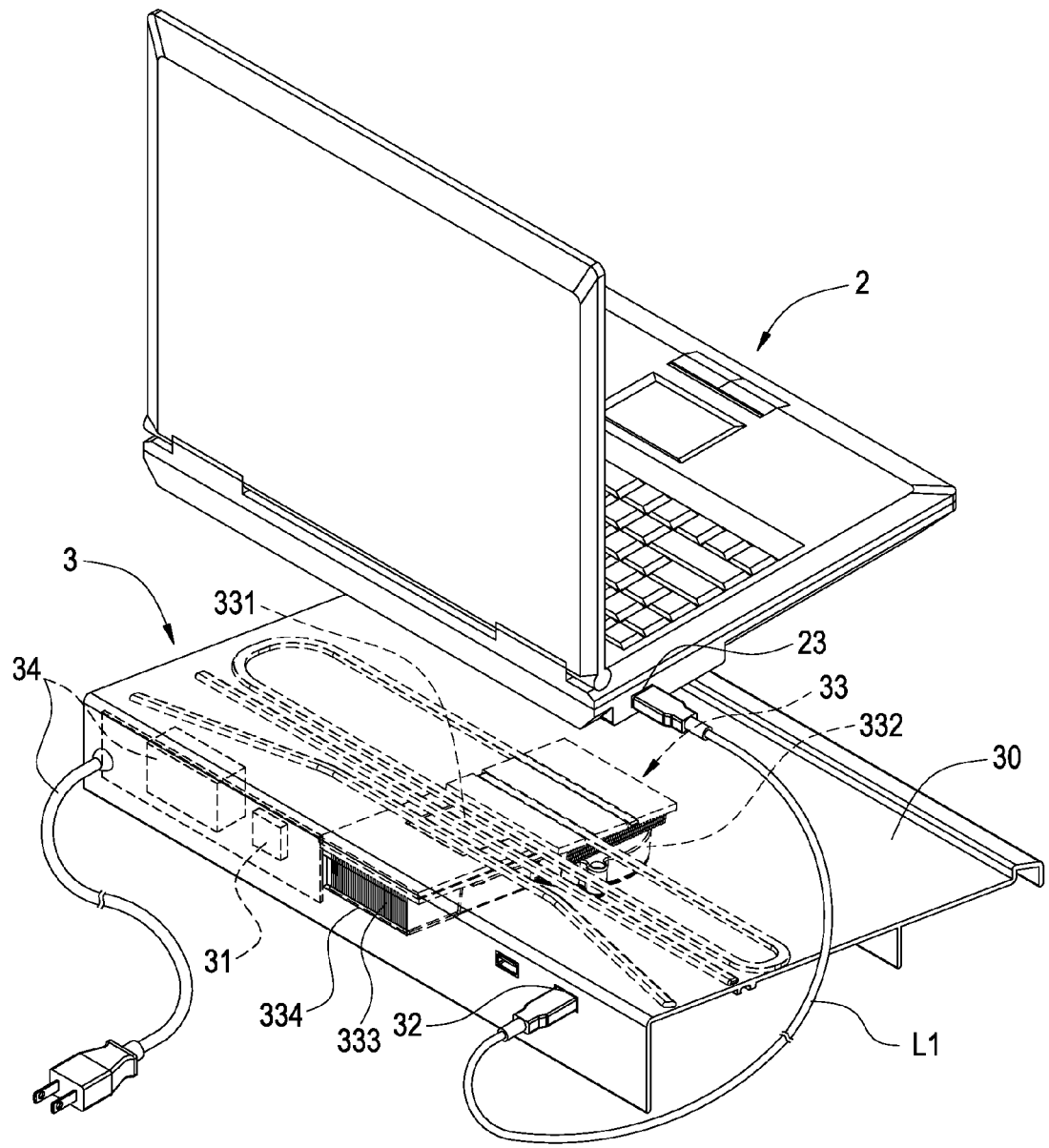
FIG. 4 is a connection schematic diagram of a preferred embodiment of the present invention.

FIG. 3 and FIG. 4 are solid diagram and connection schematic diagram of a heat sink of a preferred embodiment according to the present invention. The heat sink 3 has a base 30 made by materials with better thermal conductivity such as aluminum or copper etc. The control unit 31, the receiving-end USB data transmission wire 32 and the heat sink device 33 are disposed in the base 30, wherein the connector of the receiving-end USB data transmission wire 32 is exposed on the base 30 for connecting the USB transmission cable L1 and the transmitting-end USB data transmission wiring 23.

If the transmitting-end USB data transmission wiring 23 and the receiving-end USB data transmission wire 32 are complete USB transmission interfaces, the heat sink 3 receives power from the computer 2 via the connection for powering the control unit 31 and the heat sink device 33. Further, the heat sink 3 further comprises a power supply 34, such as a battery or a power wire connected to a wall power socket, disposed in the base 30 and is electrically connected to the control unit 31 and the heat sink device 33 for offering additional power to the control unit 31 and the heat sink device 33.

The heat sink device 33 mainly comprises a thermoelectric cooler 331, a heat sink fan 332 and a heat sink body 333, wherein the thermoelectric cooler 331 preferably is a thermal cooling circuit and has corresponding a cool end surface 3311 and a hot end surface 3312. The cool end surface 3311 is attached to the bottom surface of the base 30. The hot end surface 3312 and the heat sink body 333 are laminated. The heat sink device 33 is powered on to trigger operation of the cool end surface 3311 of the thermoelectric cooler 331 for reducing the temperature evenly across the surface of the base 30 via thermal conduction. Thus, when the computer 2 is disposed on the base 30, the excess heat generated by the computer 2 is conducted to the cool end surface 3311 via the surface of the base 30. The heat sink body 333 is attached to the hot end surface 3312 to facilitate heat sinking on the hot end surface 3312. When the heat sink fan 332 is power ON, the hot air accumulated above the heat sink body 333 is ventilated via the heat sink fan 332 and evacuated from the a heat dissipation pore 334 at on end of the heat sink device 33a to achieve the optimized heat sinking.

Figure 5:
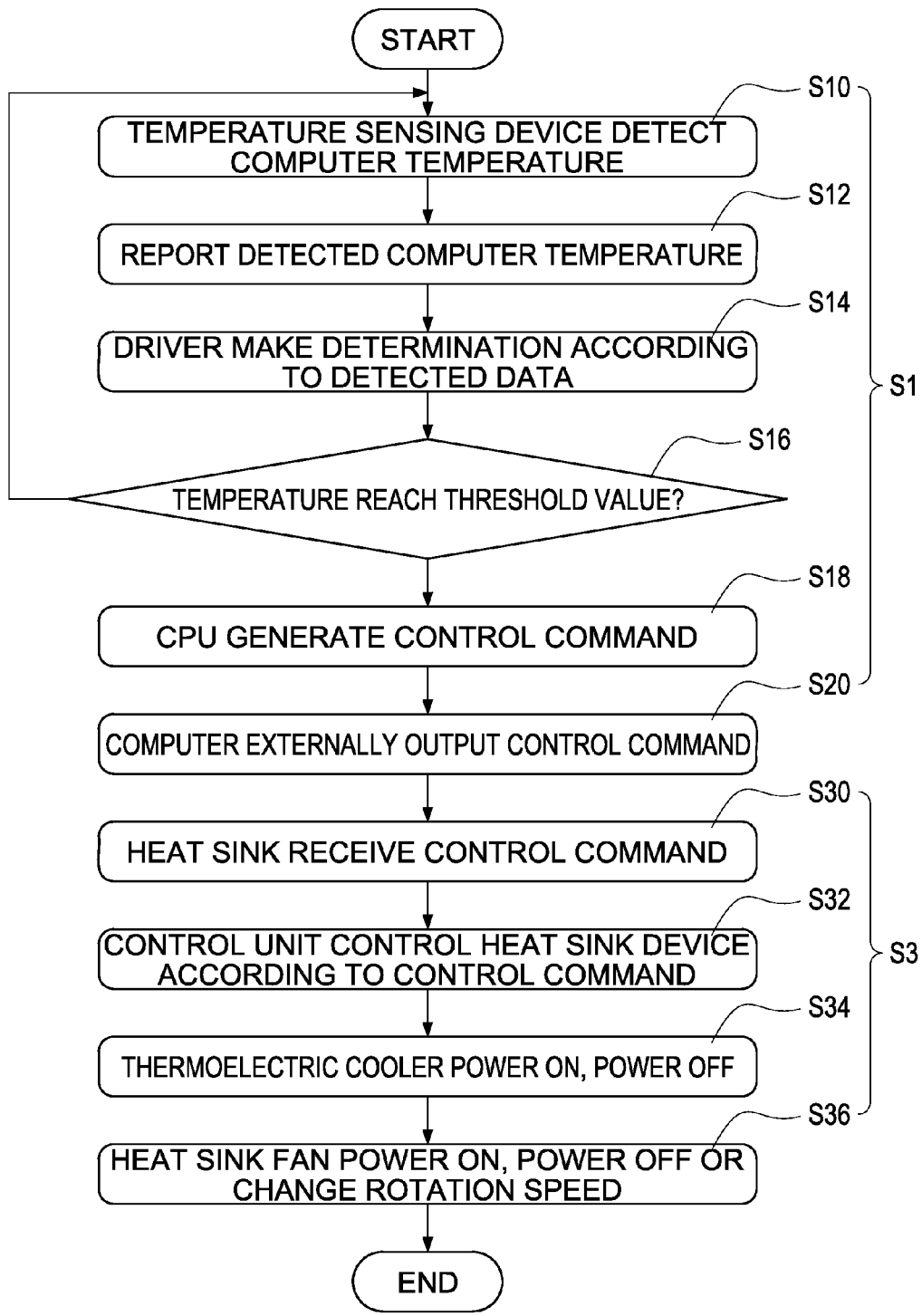
FIG. 5 is a flow chart of a preferred embodiment of the present invention.

FIG. 5 is a flow chart of a preferred embodiment of the present invention. The heat sinking method of the present invention comprises steps in the following. The notebook 2 detects internal temperature status of the notebook 2 (step S1). Following that, the heat sink 3 auto controls the operations of the heat sink device 33 according to the temperature of the notebook (step S3). The detailed steps are explained in the following, wherein step S1 further comprises sub-steps S10~S20, and step S3 further comprises sub-steps S30~S36.

Firstly, the computer 2 detects internal temperature of the computer 2 via the temperature sensing device 22 (step S10), and the temperature sensing device 22 reports the detected data 於 after detecting the temperature (step S12). Following that, the driver 24 makes a determination according to the reporting detected data (step S14). The determination is made mainly for determining if the internal temperature of the computer 2 reaches a threshold value required to send a control command C1 (step S16). In step S16, if the result is no, then the process moves back to step S10, the temperature sensing device 22 continues to detect the temperature of the computer 2; if the result is yes in step S16, then the driver 24 drives the CPU 21 to generate the corresponding control command C1 (step S18).

As mentioned above, for example, when the heat sink device 33 is powered OFF and the temperature of the computer 2 exceeds a first threshold value, the driver 24 drives the CPU 21 to send the control command C1 for powering ON the heat sink device 33 (i.e. powering ON the thermoelectric cooler 331 or/and the heat sink fan 332).

In another example, when the heat sink fan 332 is powered ON and the temperature of the computer 2 exceeds a second threshold value, the CPU 21 sends the control command C1 to increase the rotation speed of the heat sink fan 332. When the heat sink fan 332 is powered ON and the temperature of the computer 2 is below a third threshold value, the CPU 21 sends the control command C1 to decrease the rotation speed of the heat sink fan 332. When the thermoelectric cooler 331 or/and the heat sink fan 332 are powered ON and the temperature of the computer 2 is smaller than a fourth threshold value, the CPU 21 sends a control command C1 to power OFF the thermoelectric cooler 331 or/and the heat sink fan 332. Among these steps, the first threshold value is lower than the second threshold value, the fourth threshold value is lowered than the third threshold value, and the first threshold value is approximately the same with the fourth threshold value which is the reference temperature to power ON/OFF the thermoelectric cooler 332 or/and the heat sink fan 332, the second threshold value is approximately the same with the third threshold value which is the reference temperature to increase/decrease rotation speed of the heat sink fan 332.

Nonetheless, the above is another preferred embodiment of the present invention and is not used to limit the scope of the invention.

Lastly, when the CPU 21 generates the control command C1 in step S18, the computer 2 externally transmits the control command C1 via the transmitting-end USB data transmission wiring 23 (step S20).

Following step S20, the heat sink 3 receives the control command C1 output by the computer 2 via the receiving-end USB data transmission wire 32 (step S30). Following that, the control unit 31 operations of the control the heat sink device 33 according to content of the control command C1 (step S32). Lastly, the thermoelectric cooler 331 is powered ON or powered OFF under the control by the control unit 31 (step S34) and the heat sink fan 332 is powered ON, powered OFF or change rotation speed under the control by the control unit 31 (step S36).

Figure 6:
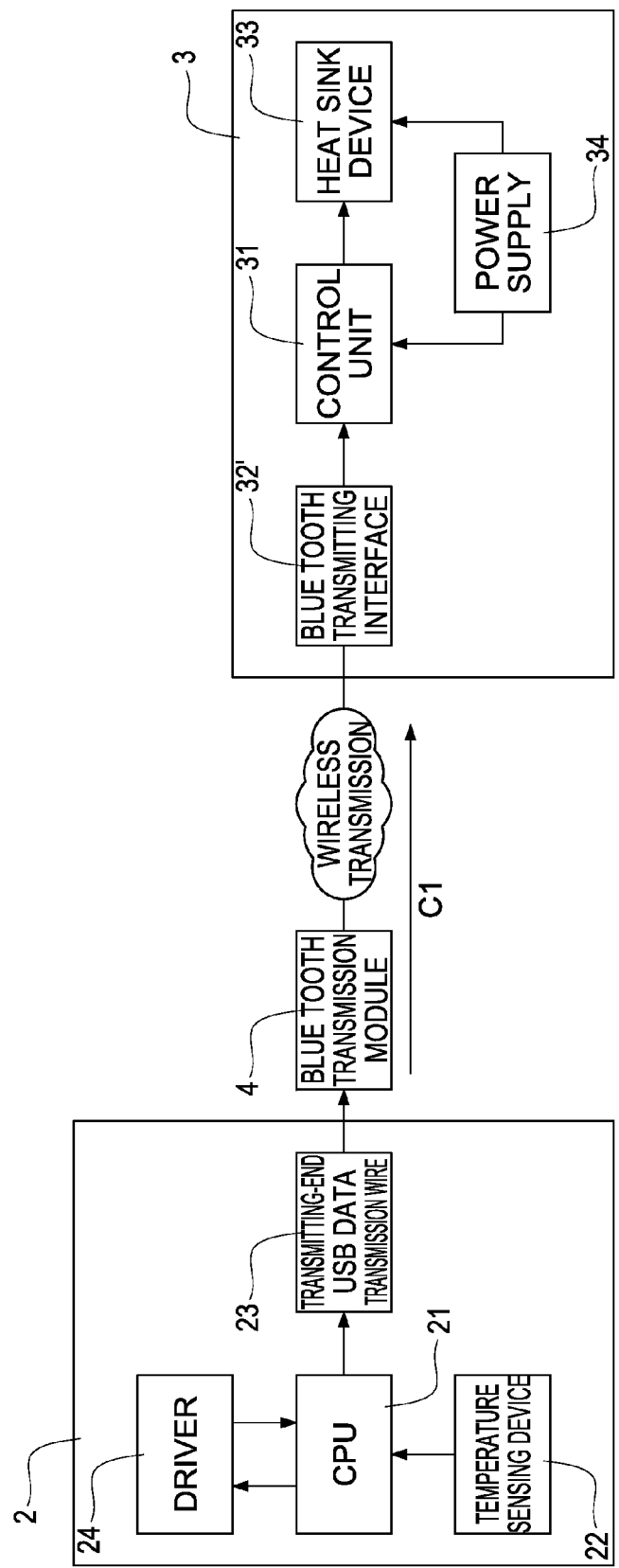
FIG. 6 is a block diagram of another preferred embodiment of the present invention.
Figure 7:
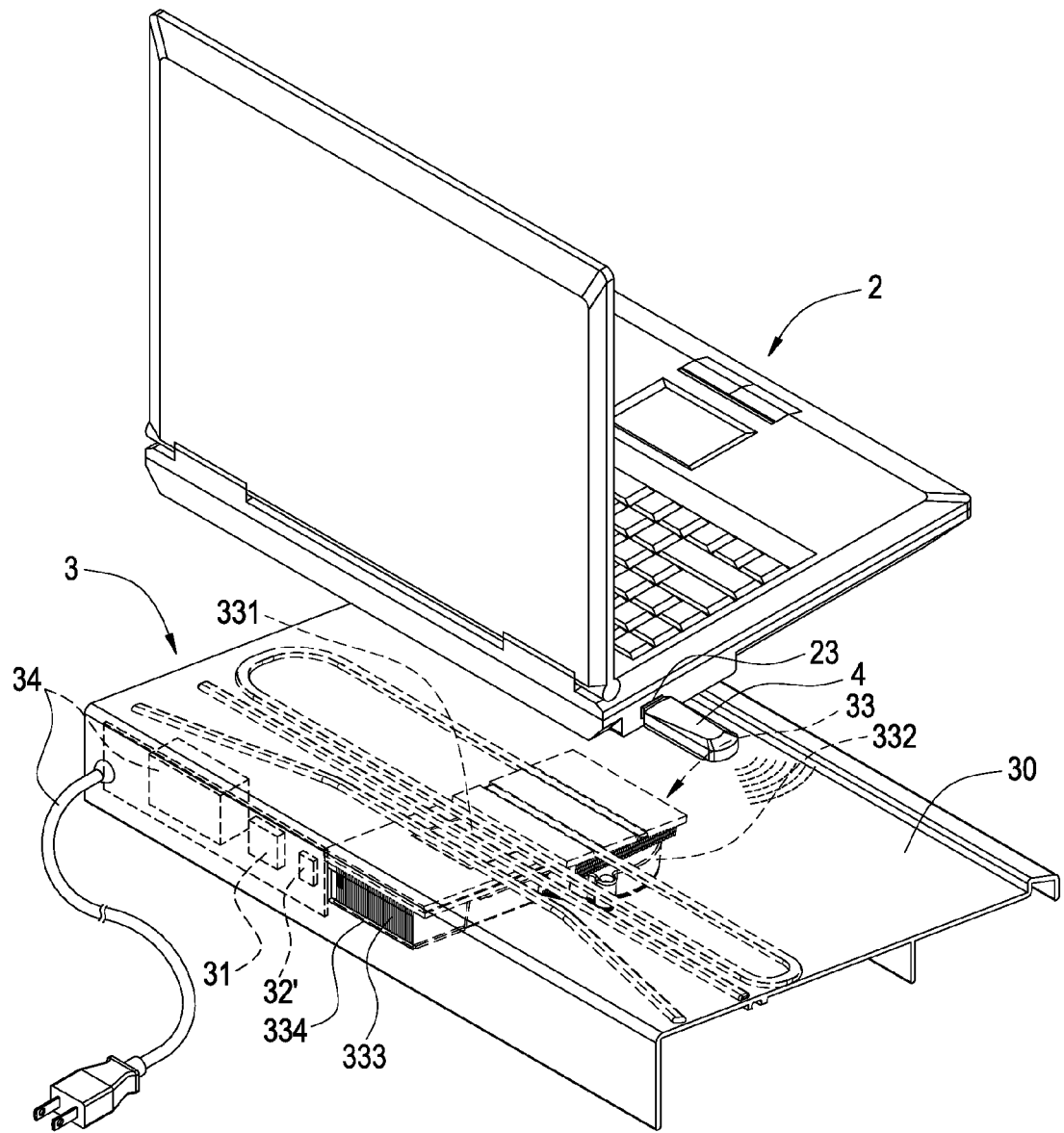
FIG. 7 is a connection schematic diagram of another preferred embodiment of the present invention.

FIG. 6 and FIG. 7 are block diagram and connection schematic diagram of a preferred embodiment of the present invention. It should be noted that, the receiving-end USB data transmission wire 32 in the heat sink 3 may be implemented via a Bluetooth transmission interface 32'. Further, the receiving-end USB data transmission wire 32 and the Bluetooth transmission interface 32' are both implemented in a heat sink. Users of the heat sink 3 are allowed to decide to connect the computer 2 and the heat sink 3 via a USB transmission interface or a Bluetooth transmission interface. The Bluetooth transmission interface 32' is electrically connected to the control unit 31. The computer 2 connects to an external Bluetooth transmission module 4 (such as the Bluetooth transmission module 4 using USB transmission interface in FIG. 7) via the transmitting-end USB data transmission wiring 23 so as to interconnect with the Bluetooth transmission interface 32' in the heat sink 3 via wireless link for wirelessly transmitting the control command C1.

As the embodiment mentioned above, the computer 2 transmit the control command C1 to the Bluetooth transmission module 4 via the transmitting-end USB data transmission wiring 23, then externally and wirelessly transmits the control command C1 via the Bluetooth transmission module 4 in step S20. In step S30, the heat sink 3 wirelessly receives the control command C1 via the Bluetooth transmission interface 32'. Nonetheless, the above is another preferred embodiment of the present invention and is not used to limit the scope of the invention. Any transmission interface for transmitting a command is applicable to the present invention.

As the skilled person will appreciate, various changes and modifications can be made to the described embodiments. It is intended to include all such variations, modifications and equivalents which fall within the scope of the invention, as defined in the accompanying claims.

What is claimed is:

1. A heat sink having auto switching function, comprising:
a receiving-end USB data transmission wire for receiving a control command from an external device;
a heat sink device; and
a control unit electrically connected to the receiving-end USB data transmission wire and the heat sink device for receiving the control command from the receiving-end USB data transmission wire for controlling the heat sink device executing corresponding operations,
wherein the heat sink further comprises a base consisted of thermal conductive materials and the receiving-end USB data transmission wire, and the heat sink device and the control unit are disposed in the base,
wherein the heat sink further comprises a base consisted of thermal conductive materials and the receiving-end USB data transmission wire, and the heat sink device and the control unit are disposed in the base, and
wherein the thermoelectric cooler has a cool end surface and a corresponding hot end surface, and the cool end surface attached to the bottom surface of the base for reducing the temperature evenly across the base surface via thermal conduction.

2. The heat sink having auto switching function of claim 1, wherein further comprises a power supply electrically connected to the heat sink device and the control unit supplying power to the heat sink device and the control unit.

3. The heat sink having auto switching function of claim 2, wherein the power supply is a battery.

4. The heat sink having auto switching function of claim 1, wherein the heat sink device comprises a heat sink fan, and the control unit controls power ON, power OFF and rotation speed setting of the heat sink fan according to content of the control command.

5. The heat sink having auto switching function of claim 1, wherein the heat sink device further comprises a heat sink fan and a heat sink body, the heat sink body and the hot end surface of the thermoelectric cooler are laminated for facilitating heat sinking of the hot end surface, and the hot air accumulated above the heat sink body is ventilated via the heat sink fan and evacuated from the a heat dissipation pore at one end of the heat sink device.

6. The heat sink having auto switching function of claim 1, wherein the base is made by aluminum or copper, and the thermoelectric cooler is a thermal cooling circuit.

7. A heat sink having auto switching function, comprising:
a receiving-end USB data transmission wire for receiving a control command from an external device;
a heat sink device; and
a control unit electrically connected to the receiving-end USB data transmission wire and the heat sink device for receiving the control command from the receiving-end USB data transmission wire for controlling the heat sink device executing corresponding operations,
wherein the heat sink further comprises a base consisted of thermal conductive materials and the receiving-end USB data transmission wire, and the heat sink device and the control unit are disposed in the base, and
wherein the heat sink device comprises a heat sink fan, and the control unit controls power ON, power OFF and increasing or decreasing rotation speed of the heat sink fan according to content of the control command.

* * * * *